Dec. 9, 1958  J. P. TARBOX  2,863,380
BARREL KNOT TIER FOR WIRE AND TWINE
Filed Sept. 29, 1954  9 Sheets-Sheet 1
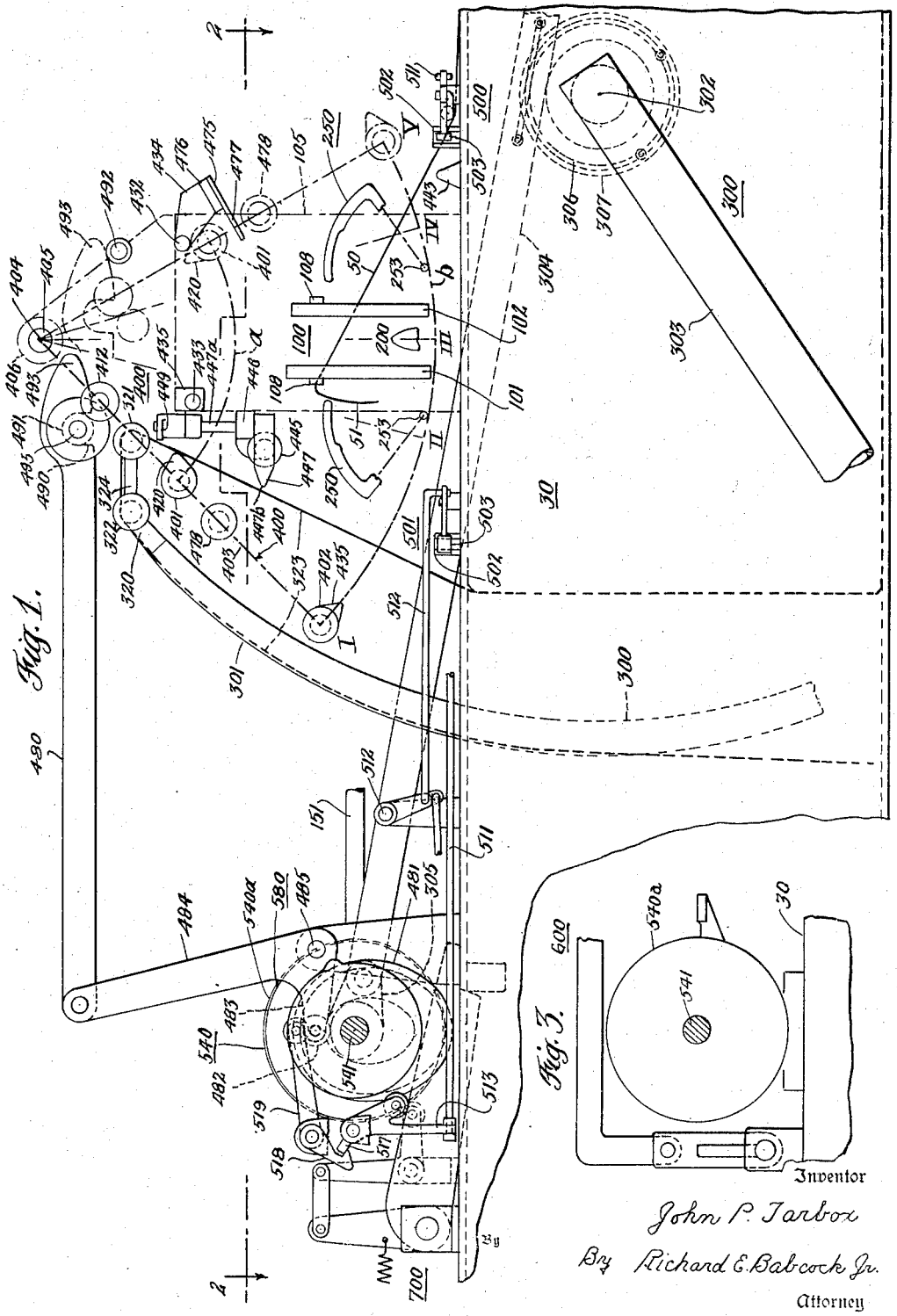
Inventor
John P. Tarbox
By Richard E. Babcock Jr.
Attorney

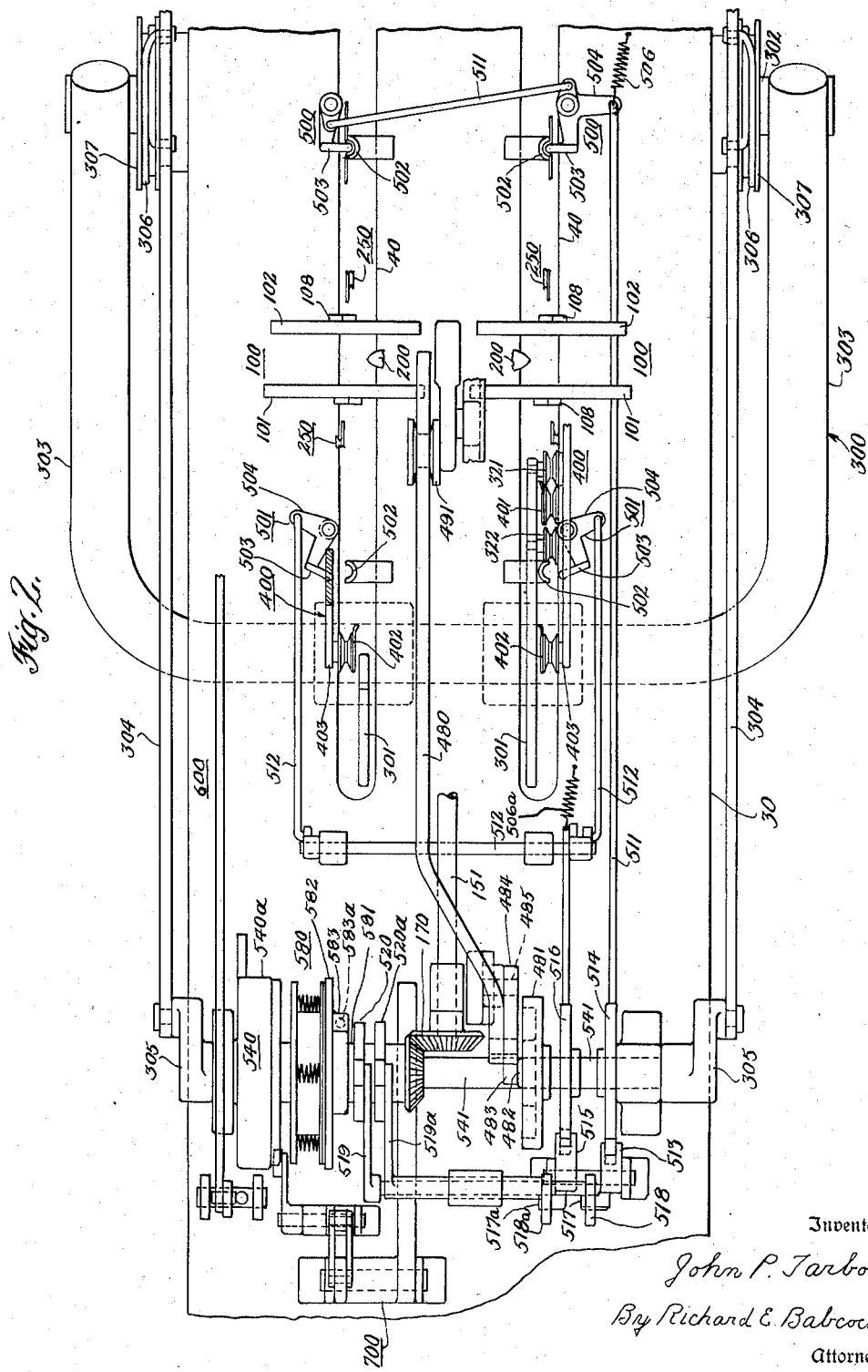

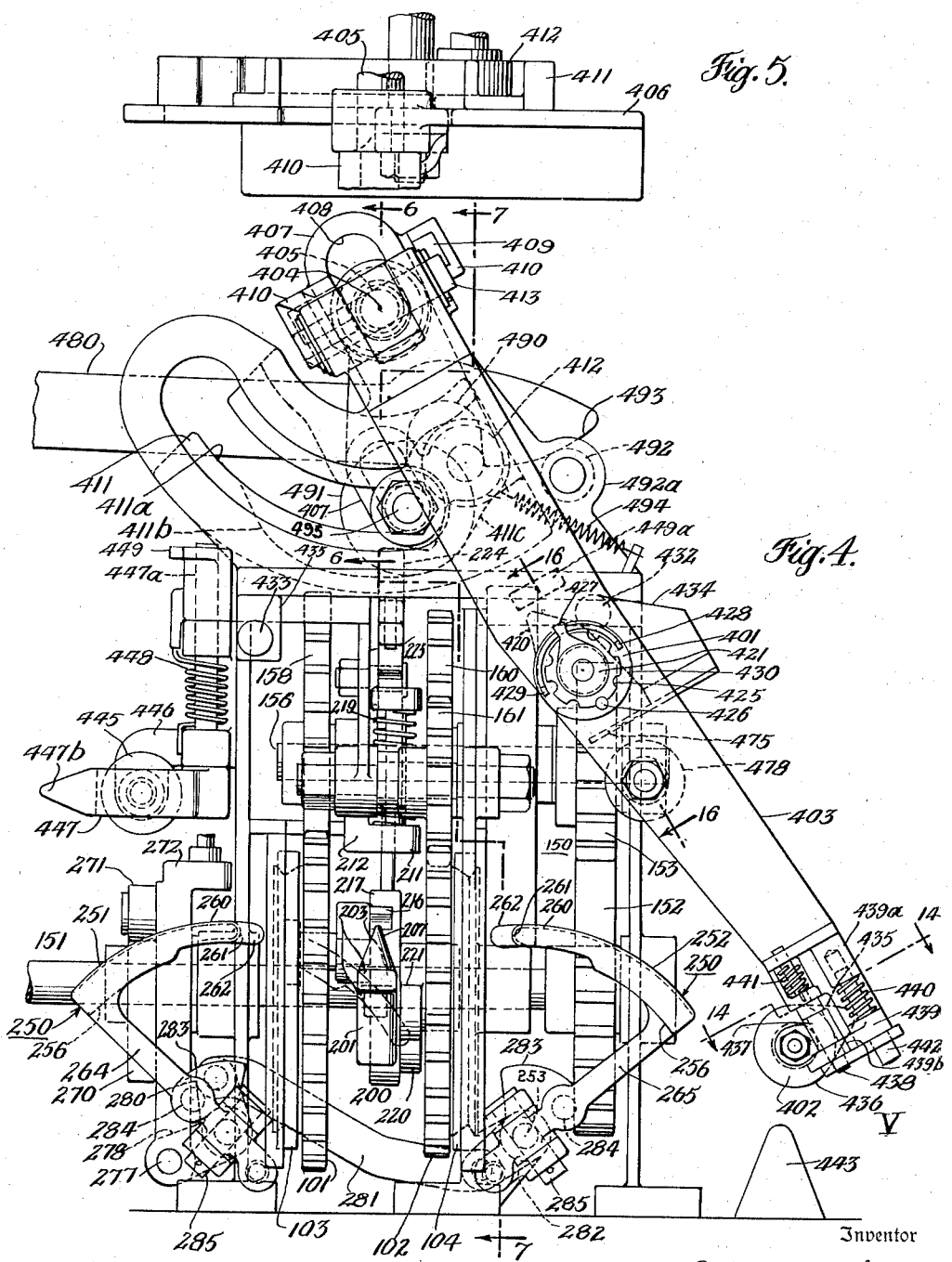

Dec. 9, 1958  J. P. TARBOX  2,863,380
BARREL KNOT TIER FOR WIRE AND TWINE
Filed Sept. 29, 1954  9 Sheets-Sheet 5
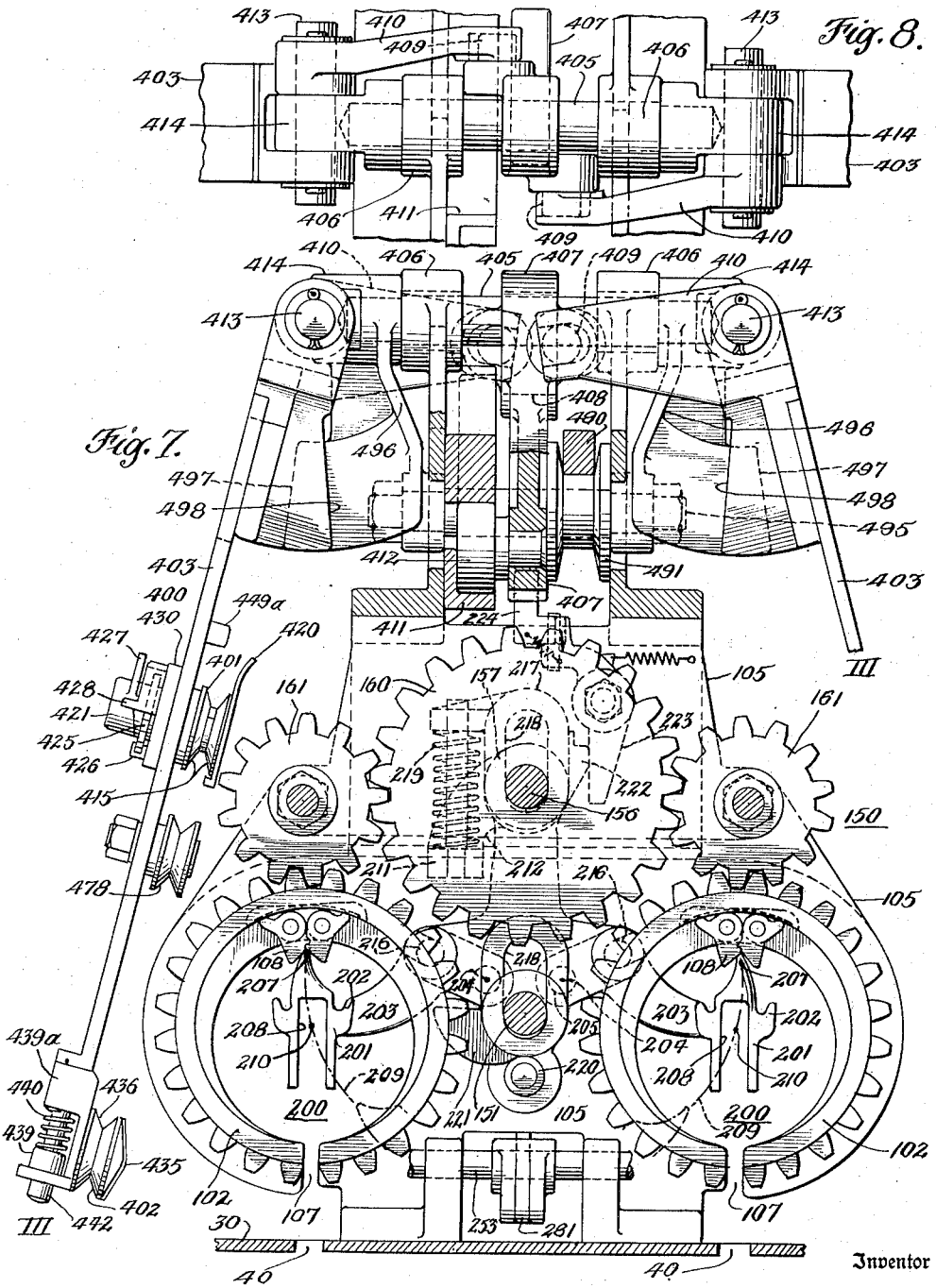
Inventor
John P. Tarbox
By
Richard E. Babcock Jr.
Attorney Dec. 9, 1958 J. P. TARBOX 2,863,380
BARREL KNOT TIER FOR WIRE AND TWINE
Filed Sept. 29, 1954 9 Sheets-Sheet 6
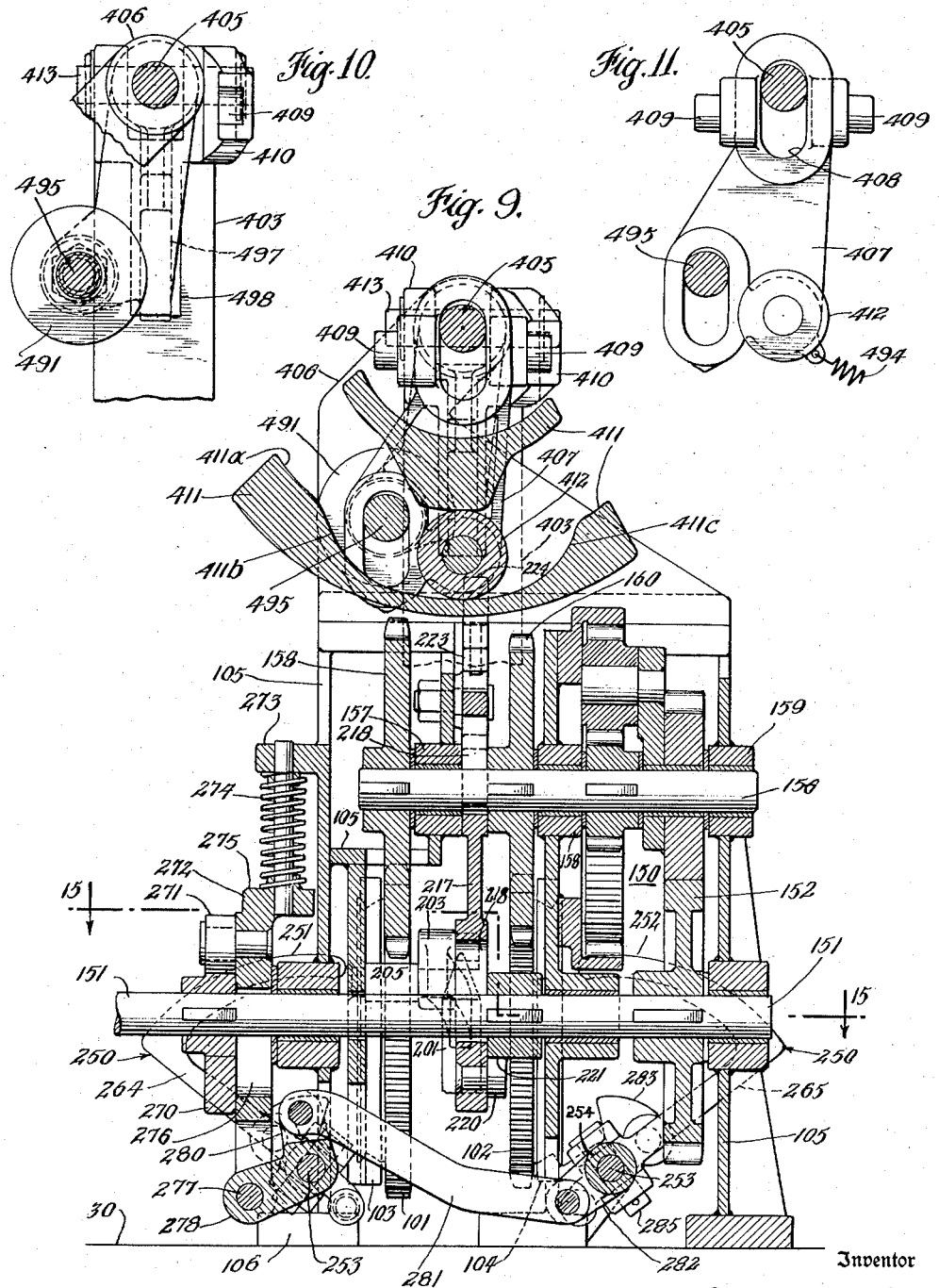
Inventor
John P. Tarbox
By
Richard E. Babcock Jr.
Attorney

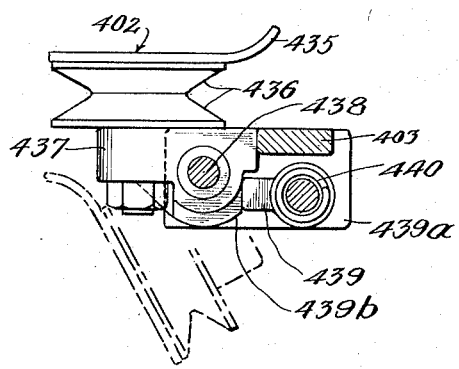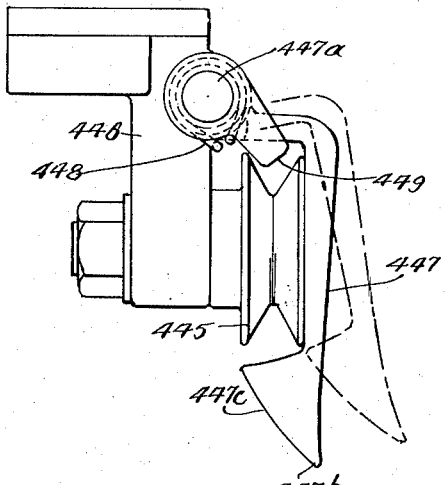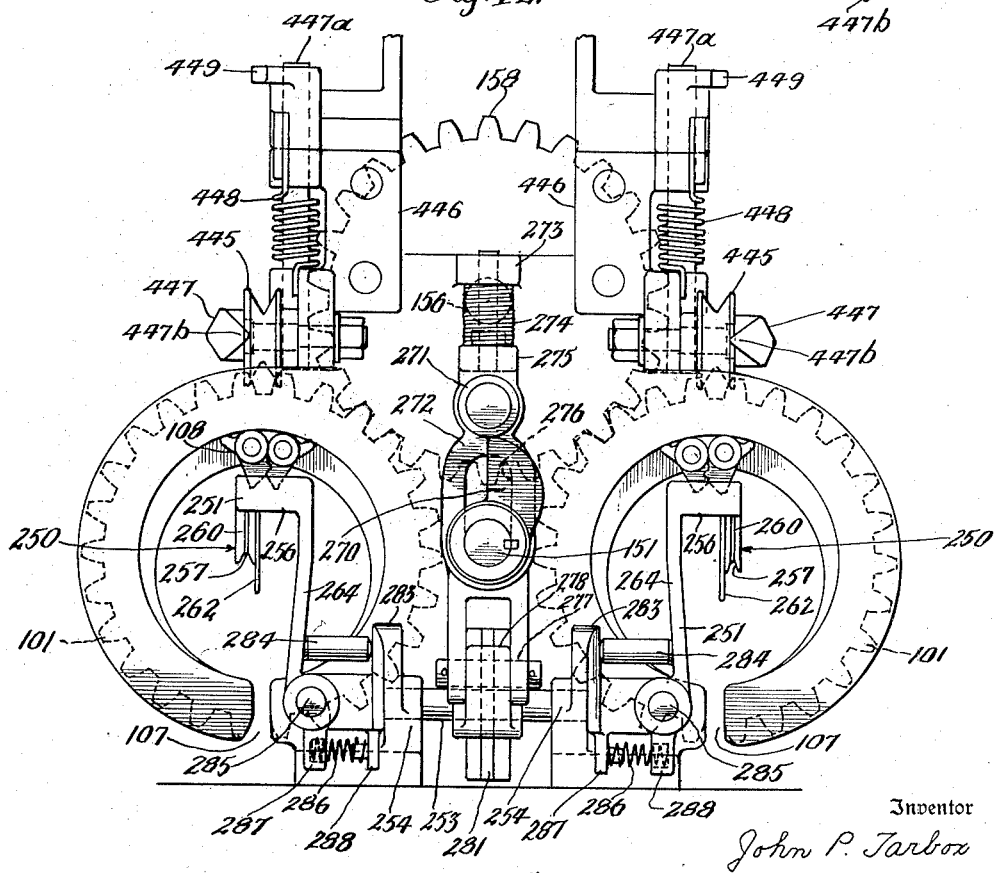

Dec. 9, 1958　　　　　J. P. TARBOX　　　　　2,863,380
BARREL KNOT TIER FOR WIRE AND TWINE
Filed Sept. 29, 1954　　　　　　　　　　9 Sheets-Sheet 8
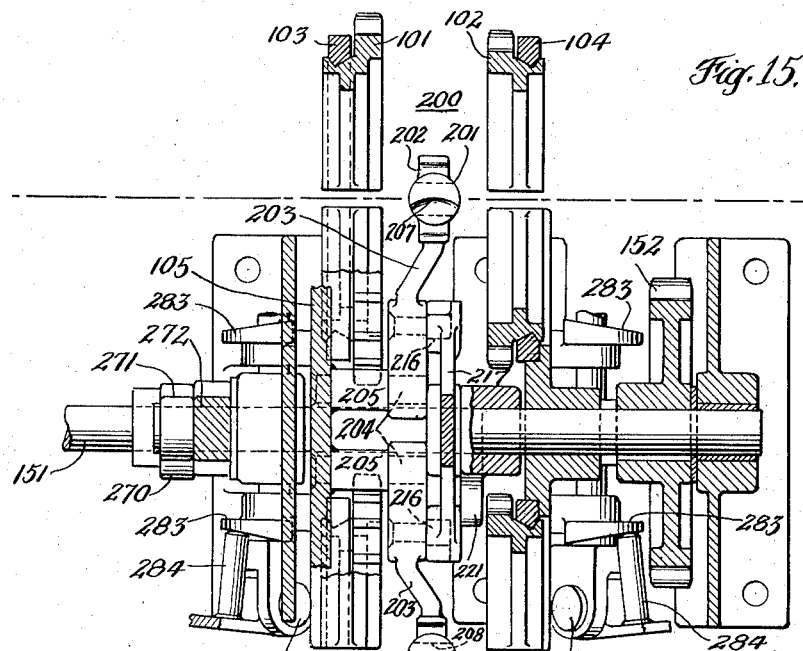
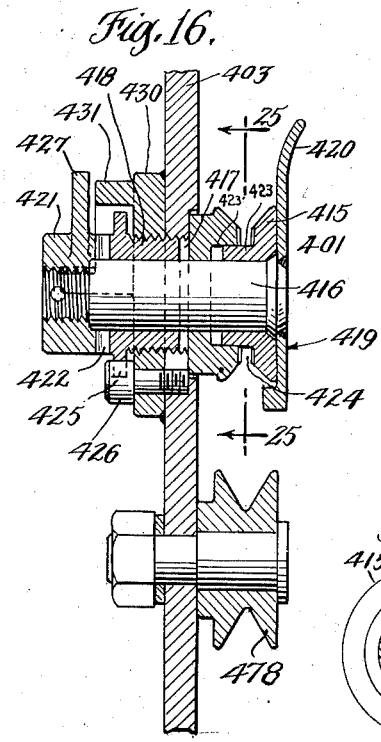
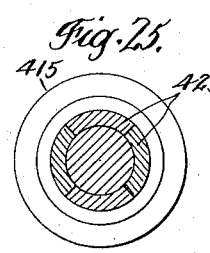
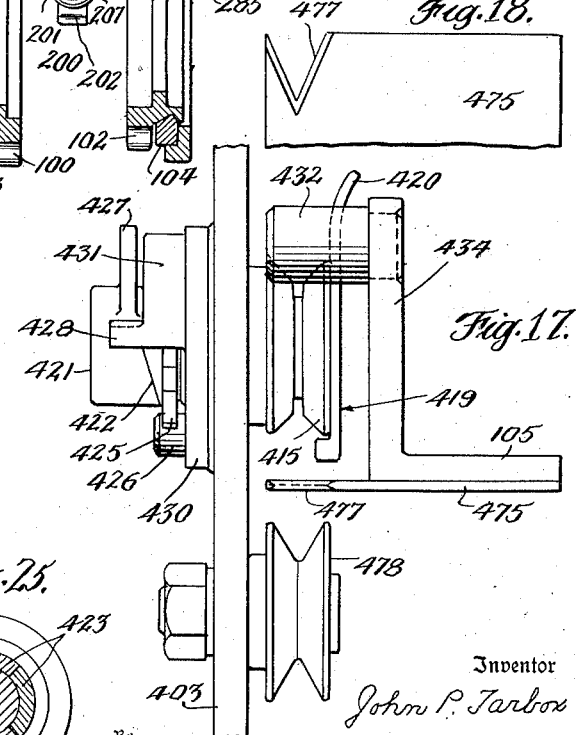
Inventor
John P. Tarbox
Richard E. Babcock Jr.
Attorney Dec. 9, 1958 J. P. TARBOX 2,863,380
BARREL KNOT TIER FOR WIRE AND TWINE
Filed Sept. 29, 1954 9 Sheets-Sheet 9
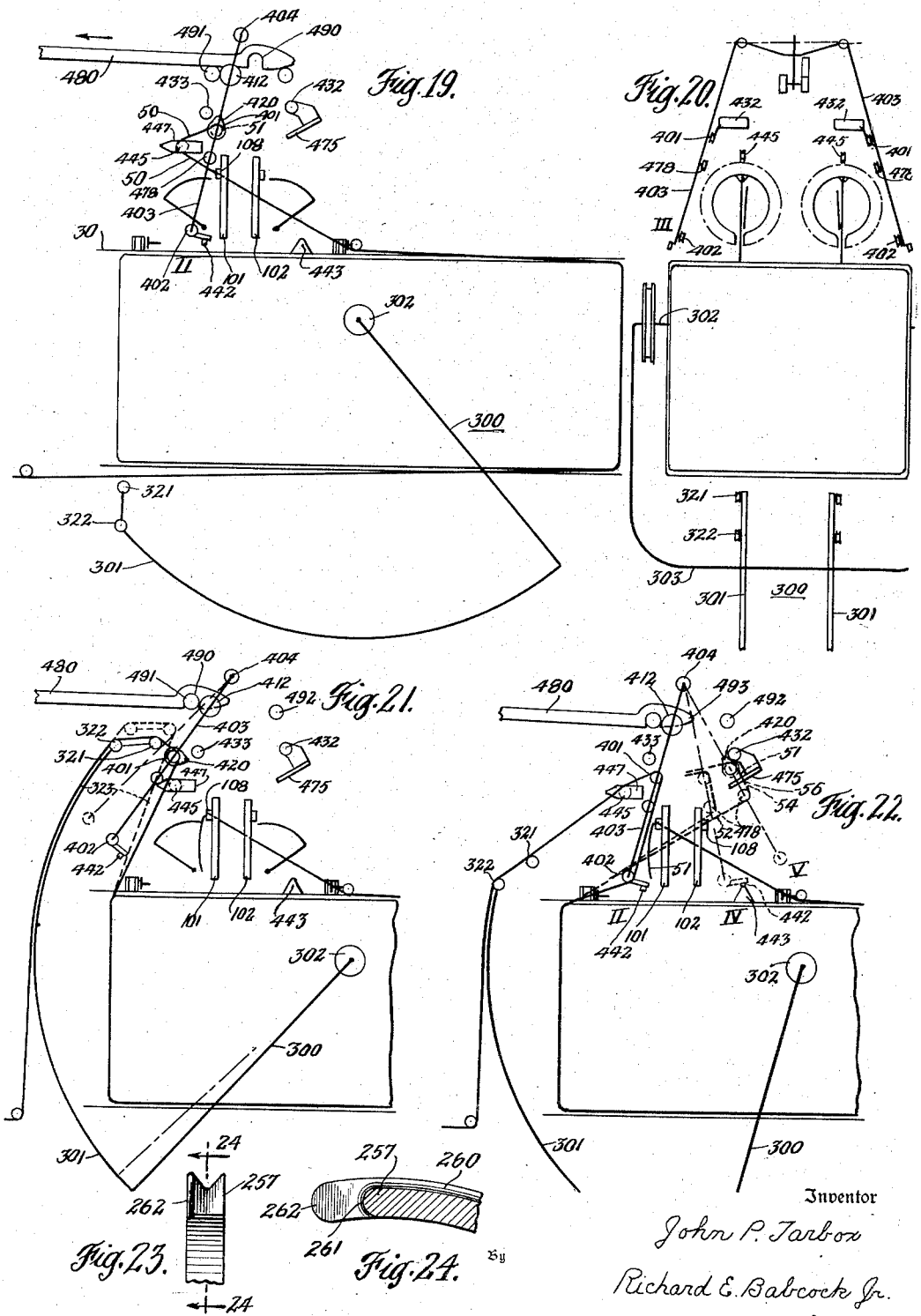
Inventor
John P. Tarbox
Richard E. Babcock Jr.
Attorney

United States Patent Office 2,863,380
Patented Dec. 9, 1958

2,863,380

BARREL KNOT TIER FOR WIRE AND TWINE

John P. Tarbox, Philadelphia, Pa., assignor, by mesne assignments, to Sperry Rand Corporation, New Holland, Pa., a corporation of Delaware Application September 29, 1954, Serial No. 459,038

40 Claims. (Cl. 100—23)

This tier is of the type adapted principally to use in connection with automatic hay balers and is illustrated in that connection. However, it may be found useful in other connections.

The primary object of my invention is the production of a tier which will effect the barrel knot in a wire tie with the same facility as it effects a barrel knot in a twine tie. This I aim to do without change of parts and with minimum adjustment of parts if there be any adjustment at all.

A secondary object of great importance which contributes largely to the attainment of the first object is the achievement of a barrel knot tier of a minimum number of operating parts and the endowment of these parts with a maximum of ruggedness and durability.

In attaining the first object I give the parts which engage the wire and twine shapes and constructions and so regulate their motions and extent of those motions as to enable them to operate equally well on either wire or twine irrespective of the difference in diameter, pliability and length of free end required to complete a barrel knot of the same number of wraps. Moreover, I embody these wire and twine engaging parts of materials and so shape and construct those materials as to afford adequate ruggedness and durability when operating on wire as well as when operating on twine. The parts here involved are outstandingly the rollers and guides through which lay of the twine is made in readiness for the knot, the clamps which hold the lays in place and during the making of the knots and which feed the lays to the knot, and the terminal end inserters which complete the knot. Thus the grooves in the rollers are of a shape which accurately positions and definitely retain in position either wire or twine. Thus the clamps are of a shape and construction which accomplishes the same adequate clamping action irrespective of whether they engage the small diametered wire or the relatively much larger diametered twine. These and the other characteristics having to do with this primary object will be described in detail hereinafter.

Attainment of the second object of my invention, simplification, ruggedness and durability, is reached largely by operating the knotter per se from a single central driving and function-controlling shaft. A combining of functions in unitary devices also contributes to this end as for example, the spreader devices which function not only to spread the lays apart at the center to receive the terminal ends, but also to fix the elevation of the knot while it is being formed and finally to release the completed knot and strip it for its fall to the bale side. The simplification is extended throughout, particularly to the needle mechanism where a remarkably efficient drive is attained.

Of the several different forms which my invention can probably be given, that of the accompanying drawings is the one which I shall describe.

In the drawings:

Fig. 1 is a diagramatic side elevation showing the tier applied to the top of a bale case of an automatic baler;

Fig. 2 is in part a plan view and in part a plan section on the line 2—2 of Fig. 1;

Fig. 3 is a fragmentary elevation view of the metering wheel clutch trip;

Fig. 4 is a side elevation view of the tier and strand laying mechanism showing the strand laying arm in its extreme forward position; at the right in Fig. 1 the spreader in spreading position; and the inserters in their retracted positions;

Fig. 5 is a fragmentary plan of the top portion only of Fig. 4;

Fig. 7 is a cross section on the line 7—7 of Fig. 4 but placing the strand laying arms in their mid-positions and showing the upper portion of the arms in elevation;

Fig. 8 is a plan view of Fig. 7;

Fig. 9 is a longitudinal section on the line 9—9 of Fig. 6;

Fig. 10 is a fragmentary cross section on the line 10—10 of Fig. 6;

Fig. 11 is a detailed view of the cam follower arm of Fig. 9;

Fig. 12 is a partial end view from the left in Fig. 4 and showing the inserters shifted inwardly;

Fig. 13 is an enlarged plan view of a switching mechanism associated with the lay-on mechanisms;

Fig. 14 is an enlarged plan section of the lower end of a lay arm taken on the line 14—14 of Fig. 4;

Fig. 15 is an enlarged horizontal plan section on the line 15—15 of Fig. 9;

Fig. 16 is a cross section of the mid-portion of the lay arm, taken on the line 16—16 of Fig. 4;

Fig. 17 is an elevation of that portion of the lay arm shown in Fig. 16 as viewed from the right in Fig. 4;

Fig. 18 is a fragmentary plan view of a cutter blade;

Fig. 19 is a diagramatic side view indicating one position of the strand laying mechanism;

Fig. 20 is a diagrammatic end view of Fig. 19; and

Figs. 21 and 22 are diagrammatic side views illustrating other poistions of the strand laying mechanisms;

Fig. 23 is a fragmentary end view of an inserter;

Fig. 24 is a cross section on the line 24—24 of Fig. 23;

Fig. 25 is a cross section on the line 25—25 of Fig. 16.

Figure 6:
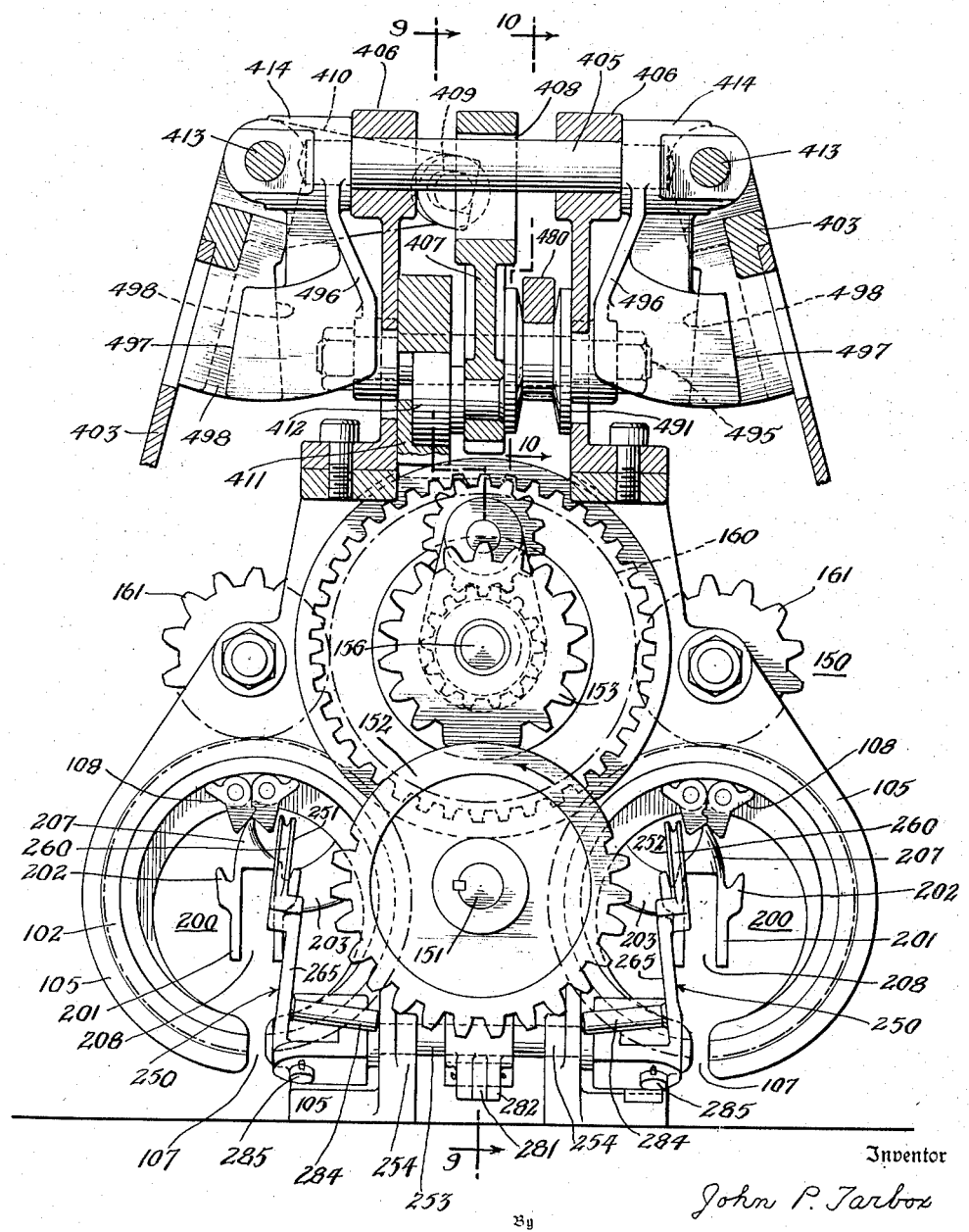
Fig. 6 is in part an end elevation looking from the right toward the left in Fig. 1 and in part a cross section on line 6—6 of Fig. 4 but with the strand laying arms in mid-positions as in Fig. 7.

The principal mechanisms comprising the tier of my invention are the knotting mechanisms per se designated generally 100, the needle mechanism 300, the strand-laying mechanism 400, a primary timing mechanism 540 which drives and controls the functioning of the needle and strand-laying mechanism, and a secondary timing mechanism 580 controlled from the primary timing mechanism and in turn driving and controlling the knotting mechanism. Ancillary mechanisms are the metering mechanism 600 which triggers the timing mechanisms as the bales reach a determined length, and the plunger stop-mechanism 700 triggered by the timing mechanism to stop the plunger in its extreme forward position during operation of the needle mechanism.

Both the primary and secondary timing mechanisms and both the metering and plunger-stop mechanisms are of the form disclosed and described in U. S. Patent No. 2,822,749 issued February 11, 1958 to Edwin B. Nolt et al., and U. S. Patent No. 2,757,600 issued August 7, 1956 to Eby and this applicant. They enter into this invention only in combination with the knotting, strand-laying and needle mechanisms and therefore will not be described in detail.

The knotting mechanism 100 effects its barrel knots by the same method as that disclosed in U. S. Patent No.

2,781,213 issued February 12, 1957, to this applicant and U. S. Patent No. 2,757,600, mentioned above, but save for the wrapping devices 101, 102, the mechanism differs widely in construction from those previous mechanisms. In addition to the wrapping device 101, 102 the knotting mechanism comprises driving gearing 150, spreader devices 200, and inserter devices 250. Likewise the needle mechanisms 300 and the strand-laying mechanisms 400 differ widely from earlier constructions. The strand-laying mechanism 400 on its part, however, operates on the same general principle as that employed by the applicant in U. S. Patent No. 2,735,359 issued February 21, 1956. Inasmuch as the tier is embodied in connection with an automatic hay baler, the mechanism is duplex, adapted to complete two ties about a given bale, one on each side of the vertical plane of symmetry. But one side of the knotting mechanism need therefore be described, for each side is comprised of identical spreading, wrapping and inserting devices, and each side is driven and operated similarly.

The wrapping device is comprised of the pair of hollow gears 101, 102 which are arranged side by side in transverse vertical planes, spaced apart a distance substantially equal to the length of the knot to be formed. The gears are journaled by lateral bearings 103, 104 internally of an upright gear-casing 105 erected on the tier base 106 which surmounts the bale case 30. Each gear has its annulus slotted as at 107 to afford peripheral access of twine or wire to the interior of the gear for the effecting of the lays. Substantially diammetrically opposite the slots 107 each gear is provided on its outer face with a wrapping clamp 108 of the form shown and described in said Eby and Tarbox U. S. Patent No. 2,757,600. There are spring clamps having mouths which open toward the axis of the wrapping gears 101, 102. They are adapted to receive the strands of the lays as they are made and to frictionally hold and feed the strands to the knot while the wrapping device is effecting its turns.

The driving gearing 150 is arranged to drive the wrapping gears 101, 102 in opposite directions simultaneously. The main driving shaft 151 of this drive gearing (see Figs. 1, 2, 4, 6, 7, 9 and 15, but particularly Figs. 6, 9 and 15) mounts externally on the forward side of the gear housing 105 a mutilated drive gear 152.

Common drive shaft 156 is geared separately to each of the gears 101, 102 of the wrapping device. To gears 101 connection is made directly from common gear 158 on shaft 156. From another common gear 160 on common shaft 156 connection is made for each of the gears 102 through idler pinions 161. This results in turning gears 101 and 102 in opposite directions. Common gears 158 and 160 are respectively given the same diameters as the diameters of the respective wrapping gears 101, 102 and therefore each of the wrapping gears will be driven at the same rate, i. e., six revolutions for each single revolution of main drive-shaft 151 and main driving gear 152. However, while driven at this rate they will be driven but four revolutions for each single revolution of shaft 151 for the reason that gears 152, 153 are mutilated gears having an inter-tooth engagement of but 240 degrees. The remaining 120 degree movement of shaft 151 is utilized for the control of the functioning of the inserting and spreading devices 200 and 250 as will hereinafter appear.

The spreading device 200 comprises as its central element a spreader per se 201 (see particularly Figs. 4, 6 and 7) adapted during the tying of the barrel knot to occupy a position in the vertical longitudinal plane of symmetry of the knot substantially that shown in Figs. 6 and 7. In this position it spreads apart the two strands to be tied together and supports them upon the axis of the knot. The main body of the spreader does the spreading while the supporting function is performed by laterally projecting shoulders 202 whose tops are grooved to receive the strands. The spreader is supported in this position by an arm 203 journaled on an axis 204 comprised of a stud 205 affixed to the front wall of housing 105 (see Figs. 7, 9 and 15). By oscillation of arm 203 downwardly to the position shown in dotted lines, spreader 201 may be removed entirely from the strands thereby removing the support afforded by shoulders 202 and clearing its main body entirely from the strands. Thus is effected a stripping of a formed knot, releasing it to fall to the side of a bale. When the arm is oscillated upwardly after a pair of strands to be tied are laid, the sharp point 207 of the spreader enters between them and the strands are parted by the curvilinear reaches of the head of the spreader, separated by the thickness of its main body, and afforded support by the shoulders 202. The main body of the spreader is provided with a deep slot 208 as shown in Figs. 6 and 7, to receive the inserters per se 251, 252 of the mechanism 250 when, the wraps having been completed, it is time for the ends of the knot to be pushed through the center. These slots 208, extend from the sides of the spreader all through its bottom, whereby there is neither interference of spreader walls which obstruct insertion of the ends, nor disturbance of the inserted ends when the spreader is withdrawn. The location of the point 207 of the spreader is on an arc 209 centered on the axis 204 of arm 203 and passing through the axis of rotation 210 of the wrapping gears 101, 102, or the axis of the formed knot (should that lie apart from the axis 210), whereby the spreader surely enters between and spreads the strands to be tied.

The control mechanism for the spreaders in their functioning, comprises a pin and slot conection 216 of each arm 203 with a vertical slide 217 having slot mountings 218 over main-drive-shaft 151 and ancillary shaft 156. The slide 217 is biased upwardly by a spring 219 reacting on abutment 211 of an extension 212 from the bearing 157 of shaft 156. At its lower end slide 217 is provided with a follower 220 which bears upon a cam 221 keyed to shaft 151. Thus cam 221, as shaft 151 revolves, will depress slide 217 against the pressure of spring 219 and positively withdraw the spreader 201. At the extreme of this downward withdrawal movement a ledge 222 on the side of slide 217 is engaged by the head of a latch 223 supported from extension 212 and spring-biased toward the slide and be held in its down position until the latch is released. When the latch is released spring 219 abruptly lifts the spreader to its strand spreading and supporting position. Release is effected by the action of the strand-laying device 400, presently to be described, the lower end of link 407 of that device engaging and depressing underlying latch extension 224 (Fig. 7).

The inserter devices 250 coact with the wrapping gear clamps 108 and the spreader 201 to insert the terminal ends between the strands after the wraps have been made. These are comprised of arcuate arms 251, 252 centered about oscillating axes 253 journaled in bearings 254 carried from the bottom of the gear case 105 front and rear, and supported on their axes by radial arms 264, 265. Axes 253 terminate laterally inwardly of the gear case slots and of the plane of the strands as laid ready for the tie, and arms 264 and 265 likewise lie inwardly of the slots and this plane. The arcuate arms 251, 252 lie respectively near but just inwardly of the planes of the strand which they are to engage and are connected with arms 264 and 265 by outward offsets 256.

The strand engaging ends 257 of the inserter arms 251, 252 are rounded and grooved as they appear in Figs. 4, 6, 23 and 24. The major grooving is of a V form and of dimensions adapted to receive in their wider portions a relatively large diameter twine, while the apex of the V is rounded on a centering arc adapted to receive in the center a strand of wire. Note the detail in Fig. 23. This grooving extends rearwardly of the engaging ends along their arcuate edges as indicated at 260 on both edges of the arms. The rounding of the ends 257 is of relatively large radius 261 whereby to ensure smooth passage thereover of wire as well as twine and to minimize wear. Wear is further minimized by hardening these points as forming them of carboloy or other material extremely resistant to abrasion. Integrally formed on one side of these points is a relatively flat projection 262 of rounded fore end and rounded edges as clearly appears in Figs. 6, 23 and 24. The purpose of this extension 262 is to enable these inserters 251, 252 the more readily to engage the strands.

These inserters 251, 252 are operated by means of a common cam 270 (Fig. 9) arranged on the main driving shaft 151 of the knotter as is the cam 221 which operates the spreader 200 (see Figs. 4 and 9). This cam 270 operates upon follower 271 borne by vertically reciprocable slide 272 whose upper end is slidably borne in bracket 273 projecting from the housing 105 and biased vertically downward against the upward urge of cam 270 by spring 274 which is confined between bracket 273 and abutment 275 on the slide. The slide is slotted in its middle at 276 to straddle the drive shaft 151 and at its lower end is provided with a pin connection 277 with a crank 278 borne by the axis shaft 253 of the inserter. An arm 280 and cross link 281 connect with arm 282 on mating shaft 253 of the inserter 252. Thus the inserters are normally held in retracted position as shown in full lines in Fig. 4, but at the proper time for the insertion of the terminal ends of the knot, 251 and 252 are simultaneously projected into engagement with the ends then held by the wrapping gear clamps 108 and to shove them downwardly between the main bodies of the strands by way of the slot 208 in the body of the spreader 201 to complete the knot.

In Figs. 4, 6 and 9 the inserters 251, 252 are shown in the idle outer position. In Fig. 12 they are shown as shifted inwardly to insert the terminal ends of the knot. When so shifted their main bodies are moved laterally outward to align them with the slots 208 of the spreader 201. This shifting is accomplished by cams 283 fixed to bearing brackets 254 in operative engagement with follower pins 284 fixed to radial arms 264, 265. These arms are oscillably pivoted to shafts 253 by pins 285 having axes transverse to such shafts and are biased laterally outwardly by springs 286 borne in sockets respectively in downward extensions 287 from the arms 264, 265 and the pivotal brackets which mount them on shafts 253.

The strands to effect the tie about the bale are initially brought through the bale case and into the reach of the knotting mechanism 100 by means of the needle mechanism 300. They are then transferred to the knotting mechanism and laid therein for the making of the knot in the tie by the strand laying mechanism 400. The needle mechanism comprises the needles 301 of an arc-shaped form in their main bodies centered about the axis 302 upon which they are mounted by means of the needle yoke 303 in the usual manner. In lieu of driving them as are the needles in the instances of U. S. Patent No. 2,735,359 above referred to, in which a rack-driven counter shaft is used, needle yoke 303 is driven directly by connecting rods 304 (one on either side of the bale case) which rods have a pivotal connection at their upper ends with cranks 305 driven by the primary timing mechanism 540 and at their lower or rearward ends connecting with the yokes 303 by tangentially adjustable flexible leads 306 with a drum or segment 307 centered on the axis 302 and connected with the needle mounting and driving yoke 303. The flexible peripheral connections 306 extend in opposite directions around the periphery of the drum to anchor points thereon and tangentially in opposite directions to spaced points on the rod 304. They constitute push-pull connections which convert the rotary motion of the crank discs 305 into rectilinear movement at the periphery of the drum 307 and thereby afford easier acceleration and deceleration of the yokes and needles than is afforded when the links are pivotally connected to the yokes, as well as to the crank discs.

The points 320 of the needles 301 bear rollers 321 and 322 which engage strands leading from the bulk coils being used (not shown) and project them in the form of loops 323 extended through the bale case from bottom to top and beyond. In this case the throw of the needle is made much greater than usual, sufficient to project the loop much higher than usual. Moreover, the foremost roller 321 is projected by extension 324 a sufficient distance forward of the rearward roller 322 to position the front reach of the loop free of the main body of the needle by a considerable distance all the way from the top of the bale case to the roller 321 itself. This is to enable the front strand of the loop to be engaged in the region between the top of the bale case and the roller 321 rather than engaging the loop at its bight and between the leading and trailing rollers as is usually done.

The strand-laying mechanism 400 effects this engagement through upper and lower strand guides or hooks 401, 402 carried on an oscillating arm 403 whose center of oscillation 404 is defined by the axis of its supporting shaft 405 journaled in bearing brackets 406 surmounting the gear case 105. Rearward oscillation of arm 403 to the dotted line position I in Fig. 1, carries both the upper and lower hooks or guides 401, 402 rearwardly past the forward strand needle loop 323, ratcheting the hook points 420, 435 past the strand and placing them behind it and in position to engage it and jointly carry it forward successively through positions I to V as shown in Figs. 1, 4, and 19 to 22. The needle meantime, of course, withdraws. In so carrying needle loop 323 forward, the upper hook 401 travels on an arc *a* (see Fig. 1) emanating rearwardly a distance below the needle 324 and needle rollers 321, 322, and passing forwardly above the wrapping gears 101, 102 while the lower hook 402 travels on an arc *b* emanating a substantial distance above the base case and passing between the bale case and wrapping gears at a level at its lowermost point somewhat below the lowermost level of the wrapping gears 101, 102 and then rising again forwardly to a position somewhat above this level. This oscillatory movement of this arm 403 (which normally lies in position V with its hooks 401, 402 in the plane of the needle loop), is not a simple oscillation but a compound one. The arm is pivoted to transverse shaft 405 in such a manner as to swing hooks 401, 402 out of and again into the plane of the needle loop 323 and, of course, the plane of the strands it is to lay in the knotting mechanism. Thereby, it may carry the strands to be laid from the needle loop around the wrapping gears 101, 102 and again into the vertical plane of the wrapping gear axis 210 whereby the strands are laid in the wrapping gears through the slots 107, which slots normally lie bottommost of the gears in this plane and in juxtaposition to the slot in the top of the bale case through which the ties about the bale extend. This movement of arm 403 is under control of a slotted cam 411 engaging a follower 412, through a connecting mechanism comprising link 407 bearing follower 412 at its lower end and having a slotted connection 408 with shaft 405 in the plane of the axes of follower 412 and shaft 405, and rocking levers 410 fixed to arms 403 at their outboard ends and having forked inner ends encompassing pins 409, both rocking levers 410 and lay arms 403 being commonly pivoted on and transversely of shaft 405 by pivot pins 413 connecting with rigidly connected shaft end brackets 414. Thus as cam follower 412 is raised and lowered by cam 411, link 407 rises and falls, and so rocks levers 410 up and down and resultantly moves lay arms 403 laterally outwardly and inwardly as required.

Each of the hooks or guides 401, 402 is of special character. Both are mounted on the inside of arm 403, thereby to ratchet over the laterally outside of the loop 323 and so to effect the lays from the inside of the arm. Hook 401 is comprised of a bipartite combined wire and twine engaging roller 415 (details in Figs. 16 and 17) rotatably mounted upon an axis member 416 rotatably mounted upon and projected through an aperture 417 in arm 403.

Member 416 is in turn journaled oscillatably in a sleeve 418 having threaded engagement with arm 403. A hook portion or head 419 having an inwardly flared strand engaging point 420 is welded to the inner end of member 416, while a nut member 421 is threaded and pinned onto its outer end. Interengaging gentle cam surfaces 422 are provided upon the adjacent axial end faces of nut 421 and sleeve 418. The cam surfaces are so related that when the hook portion or head 419 (which functions as a control arm) is turned counterclockwise to direct point 420 upward as it appears in Figs. 4, 16 and 17, the bipartite roller 415 is free to revolve upon axis 416, but when it is turned clockwise to direct the point forwardly as in full lines in Fig. 1, the cams 422 pull the head outwardly and draw the two parts of the bipartite roller 415 together and against the inner face of arm 403 to clamp the roller against rotation.

The bipartite roller 415 is made in two transaxial halves inter-locking together for forced revolving about axis 416 in unison, by interleaving axially extending segments 423 and of their hub portions. Sufficient axial clearances 424 are provided to enable the juxtaposed faces of roller groove 424 to be engaged with a wire or twine strand under the action of cam surfaces 422 and be firmly clamped tto arm 403 along with the roller 415 which bears it. The juxtaposed walls of groove 424 are formed radially sufficiently steep and radially corrugated to assure clamping the strands without radial dislodgement. Segments 423 have circular peripheries affording rolling continuity for the strands during their rolling action.

Turning the threaded-in sleeve 418 will adjust the parts to accommodate twine and wire of different diameters and also adjust the degree of the clamping action of cams 422, for such turning of the sleeve moves the cam surface on the sleeve toward or from the coacting surface on nut 421. To fix such adjustments sleeve 418 is provided with a peripherally notched flange 425 the notches of which are engaged by a pin 426 threaded into arm 403. To fix the angular positions of the hook or guide point 420 nut 421 is provided with a radial projection 427 and arm 403 with angularly spaced stops 428, 429 in its path (see Figs. 4 and 17). Jointly to bear these stops and to provide greater threaded bearing for sleeve 418 a disc 430 is welded to the outer face of arm 403. Such a disc may be cast with a flange 431 on which are formed the stops.

Coacting with the point 420 of hook or guide 401 to stop the rolling action of roller 415 and to clamp and fix the wire or twine to the arm 403, are a pair of pins 432, 433 affixed to arms 434, 435 projected laterally outward respectively from the forward and rearward portions from the frame 105. (See Figs. 1 and 4). These occupy such relation to the path of travel of hook or guide 401 as to enable the forward one of them, 432, to engage the under edge of point 420 and so rotate it counterclockwise to stop the revolving of roller 415 and fixedly clamp the strand it carries to arm 403, and to enable the other, 433, to engage the upper edge of the point 420 as arm 403 leaves position II to again take up position I, to rotate the hook clockwise and so release the strand clamped to the arm and release the roller 415 once more for free rotation about its axis 416. Stops 428 and 429 limit the degree of oscillation of the hook 419 whereby to present its point 420 always at the proper angle for effective engagement by the respective pins 432, 433, and at the same time prevent movement of the point 420 beyond the range of its effective engagement with the needle loop 423.

Referring now to Figs. 4, and 14, it will be observed that the hook 402 is of radically different construction. Instead of being arranged to clamp and fix the engaged strand to the arm 403, it is arranged to release the strand from the arm 403 when the arm moving forwardly, reaches position IV (Fig. 22). To this end its hook point 435 and associated roller 436 are mounted on a block 437 which is swivelly mounted on a pintle 438 in radial extension of arm 403, but normally held non-rotatively against counterclockwise swivelling movement by a vertically reciprocable latch 439 mounted in ears 439a on arm 403; and engaging the fore end of an arcuate stop 439b on block 437. Latch 439 is biased downwardly to latching position by a spring 440 while block 437 is biased forwardly to latched position by torsion spring 441. Hook 402 occupies its latched operative position (which is its normal position for engaging needle loop 323 in the same plane with hook 401) in all positions of arm 403 except position IV. In this position latch 439 through the extension 442, is engaged by a cam 443 located in its forward path alongside of the slot in the bale case with the result that the latch 439 is raised above stop 439b and the tension in the strand then being carried by roller 436 swings hook or guide 402 counterclockwise to the dotted line position shown in Fig. 14 thereby releasing the strand from arm 403. The relation of the parts is such that this takes place just as the strand carried reaches the vertical plane of the gear slots 107 of wrapping gears 101, 102, whereby the strand may pass through the slots to the hollow interiors of the wrapping gears. When the strand carried by 402 is thus released spring 441 immediately returns its bearing block 437 to its normal position under the control of latch 439, the latch riding over the upper face of stop 439b and being seated by spring 440 in operative engagement with the circumferentially presented end locking face thereof, as in Fig. 14.

Ancillary to the strand laying arm 403 is a fixed lay feed guide or roller 445 on the needle side of wrapping-gear 101 (see Figs. 4, 12 and 13). This roller or guide 445 lies substantially in the vertical plane of the axis of the wrapping-gears 101, 102 and just above the extended line of the free end strand which passes from the wrapping clamp 108 of gear 101 forwardly to the top of the bale (Figs. 1 and 19). Its purpose is to guide the free end strand into the adjacent wrapping clamp 108 as it is drawn forward by the advancing end of the bale being formed. This roller 445 is supported from the gear case by a bracket 446. Affixed to a pintle 447a journaled in ears on the bracket 446 for limited oscillation across the rear of the periphery of roller 445 is a strand switch 447 having its latch-shaped point 447b out-turned. The switch 447 is biased by a spring 448, laterally outwardly from a position in which its point 447b overlies the periphery of roller 445 to a normal position in which the point lies laterally outwardly of this plane, while its inward face 447c delivers forwardly to the groove of the roller. A lever arm 449 affixed to the upper end of pintle 447a normally projects into the path of projection 449a on lay arm 403. As the lay arm 403 passes rearwardly toward the needle loop, arm 449 is engaged and switch 447 is oscillated inwardly to the full line position of Fig. 13, but when arm 403 returns with the needle loop to position II projection 449a leaves arm 449 and spring 448 moves switch 447 to its dotted line position. The result is that the front strand of the needle loop 323, newly engaged by hooks 401, 402, is passed by ancillary roller 445 without engaging the point of switch 447, for the point is then in its full line position; but a moment later the point of the switch is projected between the front and rear strands of the needle loop 323 and the rear strand, caught by the point, moves over its inward surface 447c and into the peripheral groove of roller 445. Thereby the front strand of the needle loop remains wholly under the control of the hooks 401, 402, while the rear strand, in position II of arm 403, is transferred to the joint control of hook 401 and fixed roller 445.

A strand cutter 475 (Figs. 1, 4 and 18) carried from the gear housing 105 is supported from the housing 105 by the same bracket 434 which supports pin 432 associated with hook or guide 401. In the present embodiment this cutter is in the form of a V-notch cutting blade 477 located in a transverse plane close to hook or guide 401, when the latter reaches or approaches its extreme forward position (V in Figs. 1 and 22) and having its cutting V-notch presenting to the bight of the strand loop then borne by hook 401. Co-acting with the hook 401 to present the bight to the notch cutter 477 and maintain it in taut condition to be snap-cut by the V-notch cutter, is a strand engaging roller 478 supported from arm 403 in the same plane as the rollers 415 and 436 of the hooks 401, 402 and substantially of the same diameter. This roller 478 is located relatively close to the hook 401 and on or slightly above the line of the needle strand lay extending from wrapping clamp 108 of wrapping gear 102 to the rear end of the bale (see Fig. 22). As in the case of the roller 445, location of roller 478 above the line of the lay the more assuredly snaps the lay into the jaws of its wrapping gear clamp 108. At the time the strand of this lay is released by hook 402 as that passes position IV (see Figs. 1 and 22), roller 478 is already in engagement with the strand, having established that engagement when the needle loop was first engaged by hooks 401, 402. The diameter of roller 478 may be made greater and its peripheral groove made deeper than those of rollers 415 and 436, whereby it the more certainly retains control over the bight of the loop after the release of the strand from hook 402.

The means for oscillating the laying arm 403 of the strand-laying mechanism 400 comprises a link connection 480 (see Fig. 1) between the arm 403 and the driving shaft 541 of the primary timing mechanism 540, the same timing mechanism which drives the needles. A slotted cam 481 on shaft 541 drives a follower 482 on the short arm 483 of a bell crank 483, 484 carried on a fixed pivot 485 and the long arm 484 of the bell crank connects with the link 480 to reciprocate the same in timed relation to the reciprocation of the needle 301. The slot of the cam 481 is so proportioned and angularly so placed as respects the needle crank discs 305, also borne by shaft 541 that lay arm driving link 480 is drawn rearwardly while the needles are being projected upwardly to present the needle loop 323 to the lay-arm 403, and is projected forwardly to carry the lay arm 403 forwardly and with it the needle loop as engaged by the hooks 401, 402 while the needle is being retracted, but the needle is given sufficient lead over the link 480 and the lay arm 403 which it operates to enable the needle to reach its extreme upper position before the hooks 401, 402 enter into engagement with the needle loop, whereby to avoid interference between the hooks and the needle point 324 or its rollers 321, 322, and the shape of the cam 481 is such as to enter the hooks 401, 402 into and remove them from the initial needle loop area before the needle moves far enough from its upper extreme to strike hook 401 on its downward stroke.

The operative connection of link 480 with lay arm 403 is a breakable connection comprised at the link end of a downwardly presenting slot 490 in the forward end of the link and a roller 491 connected jointly with arms 403 by cross pin 495 and engaging in the slot 490. (See now Figs. 4, 6, 7 and 9–11). A fixed pin or roller 492 borne by a bracket 492a upon the front of the housing 105 engages the cam-shaped frontal projection 493 of the link 480 as arm 403 is approached to its extreme forward position (see position V in Figs. 1 and 4) and just as it reaches this extreme forward position lifts the front end of the link 480 sufficiently to free it from roller 491, thereby uncoupling arm 403 from the link just as the primary timing mechanism 540 comes to rest and the needles are fully retracted. Thereafter arm 403 is free to be oscillated rearwardly against the tension of the forwardly acting biasing spring 494 (Fig. 4) quite independently of link 480. Roller 491 in such case travels rearwardly away from the coupling groove 490 but remains in the plane of the groove and beneath the main body of the link 480. Upon the next succeeding needle operation therefore as link 480 is moved rearwardly, its frontal cam projection 493 passes off of the uncoupling pin 492 and the main body of the link slides over pin 491, until groove 490 reaches pin 491, whereupon the broken coupling is once more restored. The arrangement of the parts is such that this will occur in position II (see Fig. 19) the position to which the drag of the free end strand will have moved lay arm 403 against the bias of spring 494 during the formation of the bale. At the lay arm end operative connection between the lay arms and link 480 comprises the cross pin 495 mounting the roller 491 and borne in depending rocker arms 496 on the same shaft end brackets 414 which bear arms 403 and rocker arms 410, laterally projecting wings 497 on arms 496 and embracing ears 498 on arms 403. Thus the lay arms may be oscillated rearwardly and forwardly by link 480 and may be oscillated at the same time laterally outward and inward by the cam 411 as a result of the rearward and forward movement.

Front and rear bale case clamps 500, 501 are arranged to be initially set by the primary timing mechanism 540 but released by the secondary timing mechanism 580. Each of these clamps comprises jaws of the form shown in Fig. 2 adapted equally well for operating upon either wire or twine. Fixed jaws 502 of concave engaging faces are erected on the bale case just inside of the bale case slots and their engaging faces are as near to the slot margins as convenient without interfering with the strand lays. Their locations are in line with the free end lays as they reach to the bale top (see Figs. 1 and 19 to 22). Movable jaws 503 are in the form of convex members complemental to the concavities of jaws 502 and arranged for oscillation toward and from the fixed jaws on the extremities of one of the arms of bell cranks 504 pivoted to the bale case on the opposite sides of the bale case slots near their outer margins. The mating arms of the bell crank are connected oppositely with the linkage systems 511 and 512. The degree of the concave-convex form of the clamp jaws and the surface condition (e. g. rough, ribbed, corrugated or the like) is chosen to operate with equal efficiency upon either wire or twine. Springs 506 and 506a respectively are interposed in the linkages to provide for common release. The forward clamps 500 have a common linkage system 511 to the primary timing mechanism and those of rearward clamps 501 have a similar common linkage system 512 to the primary timing mechanism. Linkage system 511 ends in the bell crank 513 operated from a cam 514 functioning at the inception of the needle movement, while linkage system 512 is operated from bell crank 515 engaged by cam 516 functioning at or shortly before the close of the needle movement. Both bell cranks become latched in clamp closing position through the engagement of their crank hub projections 517 and 517a respectively each with a different one of the two spring latches 518 and 518a of bell crank form. The arms 519, 519a of these latches lie in a position to be engaged respectively by release cam 520, 520a on the periphery of driven member 581 of the secondary timing mechanism 580. These cams 520 and 520a function just at the close of the cycle of the secondary timing mechanism, that is to say, just as the spreader 201 is being withdrawn to release the completed knot to the side of the bale.

But little description of the primary and secondary timing mechanisms 540 and 580 and their relationships to each other and to the metering and plunger latching mechanisms 600 and 700 is required for the reason that the constructions of these several mechanisms and their interfunction is in all essentials similar to the disclosures of the co-pending applications above referred to, particularly in U. S. Patent No. 2,757,600 and 2,822,749 mentioned earlier. Briefly and in general terms, a link 600 (Fig. 3) operated from the metering wheel (not shown) initiates the trying cycle by tripping the clutch 540a of the primary timing mechanism 540 to go through one revolution and stop, the clutch being of that type. In the process of the revolution of the driven member of the clutch, the clutch is temporarily removed from the metering mechanism control as is usual. The single revolution of the clutch drives shaft 541 through that same single revolution. Because the clutch is driven but one revolution for one stroke of the plunger and adjusted to start its revolution only when the plunger is in or near its extreme forward position, the needles are advanced and retracted in the time required for one plunger stroke. At the inception of movement of the needles the plunger latch mechanism 700 comes into play to latch the plunger in its extreme forward position and it remains in this position so long as the needles are in the bale case, the latch causing the plunger to break connection with its driving mechanism in a well known manner, substantially as shown and described in the E. B. Nolt U. S. Patent 2,236,628 of April 1, 1941. Not until the primary timing mechanism has closed its one revolution cycle is the latch released and the plunger drive restored. Just at the close of this cycle the primary timing mechanism trips off clutch 582 of the secondary timing mechanism 580 for its one revolution and stop cycle. This too occupies the period of one stroke of the plunger, that stroke immediately following the period of dwell of the plunger under control of the primary timing mechanism. The clutch 582 of the secondary mechanism also being a one revolution and stop clutch and controlling its own stop movement, all timing comes to a stop with the close of its single revolution. Thus the entire tying time is that comprehended by two successive strokes of the plunger driving mechanism.

As in the application referred to, the strand laying operations are performed during the first half of this period under the control of the primary timing mechanism, while the knot forming operations are performed under the control of the secondary timing mechanism during the second half of this period.

With this understanding, the overall operation of the mechanism can be readily followed. Let us assume that the tier has been initially threaded, ready for operation, either by hand or by virtue of an earlier completion of a bale or bales occuping the bale case, but that the metering mechanism 600, while about to trip the primary timing mechanism 540, has not yet tripped it. The needle 301 at such time lies idle below the bale case. The arm 403 lies in position II (Fig. 19) to which it has been drawn against the bias of spring 494. It has been drawn to position II by the free end strand 50, the extremity 51 of which is clamped to arm 403 in hook 401 by counterclockwise movement of the hook point 420. The body of strand 50 passing over fixed roller 445 is then held in proper position for the wrapping operation by wrapping clamp 108 of the gear 101. Strand 50 may have been threaded into this position by hand, in which event its extremity 51 may have been placed in hook 401 and clamped to arm 403 by manual manipulation of point 420, and arm 403 dragged by hand from position V to position II either by pulling strand 50 or by pushing arm 403 to position II, or both. However, if strand 50 has resulted from a tying operation on a preceding bale, the advance of the front end of the succeeding bale will have furnished the drag on strand 50 which pulled arm 403 from position V to position II after the bight of the needle loop has been severed by cutter 475 and the preceding tie has been completed. At this time there are no other strands in the tying mechanism per se, but strand 50 extends around the front end of the bale just completed (or that just started) and along the bottom of the bale case in the plane of the needle point and the bulk coil of wire or twine.

The moment the bale is completed and the primary timing mechanism 540 is tripped and its motion starts the needle 301 starts its movement through the bale case and the driving link 480 of arm 403 starts rearwardly (in the direction of the arrow, Fig. 19). Arm 403, however, remains in position II until needle 301 approaches its extreme upward movement, for not until then does groove 490 of link 480 reach pin 491 in the number II position and again couple link 480 with arm 403. Movement of arm 403 initiated at this juncture, first brings the upper edge of hook point 420 into engagement with the fixed pin located just rearward of position II, 433 thus rotating the hook 401 clockwise and so causing cams 422 to separate the halves 415 and release the end 51 of the free end strand 50. This places strand 50 thereafter fully under control of wrapping gear clamp 108.

Arm 403 continuing rearwardly, hooks 401, 402 cross the front strand of needle loop 323 the moment they are clear below the needle point roller 321 and ratchet past the strand. A quick movement of hooks 401, 402 into and out of the area of the loop ensues before the needle roller 321 (as the needle starts back) can cross the path of movement of the upper hook 401, and hooks 401, 402 then have control of the needle loop 323.

At the time that hook 401 engages the front of the needle loop 323 and progresses it forwardly until the front strand of the needle loop has passed the point 447b of the switch 447 (see Figs. 4 and 21), switch 447 is held away from the loop 323 by the engagement of projection 449a of arm 403 with lever 449. At this moment, however, the lay arm 403 nears position II in which projection 449a passes out of engagement with lever 449 and so releases switch 447, permitting it to enter the loop 323 between the front strand and the rear (Fig. 21). The next instant therefore, the rear strand of the needle loop is switched into the groove of roller 445 (Fig. 22) where it remains during the passage of arm 403 all the way from position II to position V, its extreme forward position. During the first part of the movement from position I to position II hooks 401, 402 travel substantially in the plane of the axis of the wrapping gears 101, 102, for the follower 412 has been engaging the relatively high rearmost portion 411a of the cam 411 (Figs 4 and 9). In the latter part of this movement and in passing out of position II however, the follower descends to the lower portion 411b of cam 411, thereby moving lay arm 403 and hooks 401, 402 laterally outwardly to pass them and the loop 323 which they carry, outside of and around the wrapping gears 101, 102. Having passed the wrapping gears lay arm 403 is returned toward the axis of the wrapping gear by the ascending portion 411c of the cam, again to place the hooks 401, 402 in the plane of the wrapping gear axis.

As hook 402 nears this plane its latch 439 is released through engagement of the projection 442 with cam 443 which lies in its path of movement (Figs. 4, 14 and 22), whereupon mounting block 437 of the hook is released and the drag of the strand which the hook bears turns it counterclockwise (dotted lines Fig. 14) thereby releasing the strand entirely from the hook just as it reaches the plane of the wrapping gear axis, whereupon the hook 402 snaps quickly back into latched position under the bias of return spring 441.

The rapid further movement of arm 403 quickly takes up the slack created through this release and this now lower strand of the loop (which extends from the rear end of the bale beneath the wrapping gears 101, 102, just below the gear slots 107 to the point of release) is instantly snapped upwardly and into the jaws of the wrapping clamp 108 of gear 102 where it becomes laid as needle stands 52 at the moment arm 403 reaches position V (Fig. 22).

Simultaneously with the near approach of arm 402 to position V the bight 54 of the loop now under the control jointly of hook 401 and the adjacent roller 478 is projected across the V-notch cutter 475 and is cut. As it is being cut (or just before), the end to be, 51 of the upper side of the loop becomes clamped fixedly to the arm 403 through the engagement of the under edge of the hook point 420 with the fixed pin 432. The loop being thus severed and the end 51 of its upper strand 50 clamped, the lower strand 52 has its end 56 (Fig. 22) released entirely to the control of wrapping clamp 108 of gear 102. Earlier, the end 51 of the strand 50 laid by the bale in conjunction with roller 445 and hook 401 was released from hook 401.

Immediately this clamping, cutting and releasing is completed driving link 480 becomes uncoupled from arm 403 through the reaction of frontal projection 493 and fixed pin 492 (see Fig. 1), the primary timing mechanism 540 comes to rest, and the secondary timing mechanism 580 is set in motion. (See application Serial No. 268,424.)

Just before arm 403 reaches position V the lower end of link 407 (which is cam-shaped for the purpose) engages the extension 224 of latch 223 (Fig. 7) which has retained the spreaders 201 in the dotted line position shown in Fig. 7. Released, spreaders 201 are projected by spring 219 between strands 50 and 52 as laid, spreading the same apart and engaging shoulders 202 thereunder to position the knot to be formed.

The closing of the cycle of primary timer 540 having initiated the cycle of the secondary timer 580, its driven member 581 institutes the single revolution of driving shaft 151 of the knotting mechanism 100 through the connecting bevel gears 170. The mutilated gears 152, 153 engage and remain engaged for 240 degrees and drive the wrapping gears 101, 102, driving the gear 101 clockwise as viewed forwardly and the other gear 102 counterclockwise, for four complete revolutions, whereupon the teeth of gear 152 disengage and gears 101, 102 again come to a stop with their slotted peripheries 107 at the bottom, in vertical juxtaposition to the bale case slot 40.

Having a few degrees lead of the disengagement of gear 152, inserter operating cams 270, just prior to the time gears 101 and 102 come to a stop, advance the terminal projections 262 of the inserters 251 (see Figs. 4 and 9) into the rotating paths of the strands 50, 52 as their fourth turn is being completed. Just as the fourth turn is completed the strands are engaged in the grooves 260 of the inserter points and their ends 51, 56 are projected through spreader slot 208 and between the main bodies of the strands as spread apart. They may stop there in the form of loops or bows as the inserters reach the extreme of their oscillating movement. If, however, as the inserters reach their innermost positions under the urge of the peak of cam 270, the lengths of ends 51 and 56 are shorter than the length required to reach to the lowermost position of the inserter ends 261 and back between the spread main bodies of the strands these ends will be freed. Loops or bows will more often remain in the case of wire than in the case of twine for the reason that less of free end strand length is required for the wrapping with small diametered wire than in the case of the larger diametered twine, but this can be adjusted as desired. Leaving the peak of the cam 270, followers 271 are snapped downwardly by springs 274 thereby to snap the inserters 251, 252 back to their normal positions, leaving the terminal ends between the strands about the spreader and so completing the knot.

At the moment the projections 262 of the inserter points are freed of the body of the spreader 201, cam 221 of the spreader mechanism (see Figs. 3 and 4) engages follower 220 of slide 217 rapidly withdrawing the spreader from between the strands, projecting it from its full line position to its dotted line position of rest (for clarity's sake only the heads of the spreaders are so shown) wherein it becomes latched, the cammed lower end of link 407 having ridden over and freed latch extension 224. This simultaneously strips the spreader 201 and its supports 202 from the completed knot and frees the knot to fall to the side of the bale.

At this juncture and simultaneously with the retraction of the spreader, cams 520 and 520a of the driven member 581 of the secondary timing mechanism strike the arms 519 and 519a of retaining latches 518 of the bale case clamps 500, 501, and all of these clamps are released.

Simultaneously also the driven member 581 of mechanism 580 is brought to a stop by engagement of stop lug 583 with stop detent 583a as in U. S. Patent No. 2,822,749 previously cited.

Already the first wad of the new bale is being pressed against the end of the bale which has just been tied and is effecting its initial engagement with the new free end strand 50, for it will be remembered that the plunger latch mechanism 700 is released at the close of the cycle of the primary mechanism 540, and the plunger during the time, has been busy upon its succeeding baling stroke. Wad by wad, as the new bale is formed, the new free end 50 is carried forward and its length foreshortened until its main body engages wrapping clamp 108 of the rearward gear 101. It is pulled through the wrapping clamp 108 and around the fixed pulley 445, so pulling arm 403 (to which the end 51 is clamped in hook 401) further rearward with each additional wad until hook 401 and arm 403 occupy position II, whereupon no further movement of the arm ensues, due to the angular position of the arm and/or to engagement between the hook 401 and pin 433. Thereafter such additional length of tie as is necessary to complete the reach around the advancing front end of the bale is drawn from the supply coil by way of the bottom of the bale.

I claim:

1. In a hay baler of the class in which bales of hay are formed in and moved longitudinally through a bale case, the combination with said bale case of a radially slotted tying element having a radially outwardly opening mouth and rotatable about a longitudinal axis on said bale case, strand laying mechanism moveable longitudinally past said element to engage a strand loop positioned on one longitudinal side thereof and lay one side of said loop in the radial slot of said element, said laying mechanism including strand guides relatively spaced in the plane of said slot, one of said guides being located to travel on a path which presents said one side to the mouth of said slot for reception therein and another of said guides being located to travel on a path removed from the mouth of said slot, said one guide being moveable to release said loop, a latch normally retaining said one guide in strand engaging position, and trip means positioned on the path of the one guide to disengage the latch and release said loop after said one side of the loop has been presented for reception in the slot and prior to termination of the movement of the laying mechanism, whereby the tension of the loop will draw said one side radially into the slot toward said other guide.

2. The combination of claim 1 including means for positioning a strand of said loop on said one longitudinal side of the tying element.

3. The combination of claim 1 including a strand severing device fixed on said bale case in the path of movement of said laying mechanism in a position to receive and sever said loop after release thereof from the said one guide.

4. The combination of claim 1 including a strand severing device fixed on the bale case in the path of movement of said laying mechanism in a position to receive and sever said loop after release thereof from the said one guide, to thus form a free end for the strand extending across said bale case, and another of said guides including means for gripping and holding said free end during formation of a bale against said strand.

5. The combination of claim 1 including a strand severing device fixed on the bale case in the path of movement of said laying mechanism in a position to receive and sever said loop after release thereof from the said one side, to thus form a free end for the strand extending across said bale case, and another of said guides including means for gripping and holding said free end during formation of a bale against said strand, resilient means yieldingly urging the laying mechanism toward the extremity of its operative movement past said laying element, said mechanism yielding toward the opposite side of said tying element responsive to the tension exerted on said strand incident to the forming of a new bale thereagainst, and means supported on said bale case for actuating said gripping and holding means to release said free end at the inception of each tying cycle.

6. In a hay baler of the class in which bales of hay are formed in and moved longitudinally through a bale case, the combination with said bale case of a radially slotted tying element and means mounting same on the bale case for rotation about a longitudinal axis, said tying element normally being at rest in a position wherein its radial slot opens toward the bale case, means for continuously rotating said element a plurality of complete revolutions during its tying cycle and bringing it to rest in said position, needle means moveably supported on the bale case for projecting a strand loop across one end of a bale in said case to a delivery point in substantial longitudinal alignment with said tying element, strand laying mechanism mounted on said bale case for moving one strand of said loop from said delivery point into said slot, and a stationary strand severing device supported on the bale case in position to receive and sever said loop as an incident to continued movement thereof by the laying mechanism subsequent to the movement of said strand into the slot.

7. The combination of claim 6 including means carried by the strand laying mechanism for gripping and holding the severed free end of said strand.

8. A strand tying mechanism for hay balers comprising a pair of relatively axially spaced wrapping gears having radial slots opening through their respective peripheries, means for rotating said respective gears during each tying cycle and bringing them to rest with said slots in predetermined registering positions, needle means for projecting a strand loop substantially into the plane of said slots at a delivery point on one axial side of said gears, a strand severing device fixedly supported on the other axial side of said gears, a strand guide disposed adjacent to said delivery point in the radial plane of said slots, a strand laying member mounted for longitudinal movement between said delivery point and said severing device, means for guiding said member laterally around said gears and guide and thence back into axial alignment therewith incident to its said longitudinal movement, hooks on said member for taking said loop from the needle means and maintaining the opposite sides of said loop in longitudinally spaced relation, a normally inoperative strand switch associated with said guide and moveable from its inoperative position to an operative position in which a strand carried by said member may be engaged by it and directed onto said guide, means carried by said member for operatively positioning said switch to direct the trailing strand of said loop onto said guide during movement of the member away from said delivery point, said member functioning during its operative movement away from the delivery point to lay the leading side of said loop in said wrapping gears along side a previously laid strand free end and thence into operative engagement with said severing device to form a new strand free end, means associated with one of said hooks for gripping said new free end, and drive mechanism for said laying member disengageable therefrom at the conclusion of said severing operation.

9. The combination of claim 8 including resilient means yieldingly urging said member toward said severing device whereby the pressure of a bale being formed against said free end may partially return the member toward the said delivery point, said guide serving to direct said new free end into the slot of said gears as an incident to the movement of the new bale, said drive means being reengageable with the arm to return same to the delivery point and thence project it through an operative strand laying stroke on the next ensuing tying cycle, and means for actuating said one hook to release said free end at the inception of each new tying cycle.

10. The combination of claim 8 including a strand spreader operatively disposed between the wrapping gears, means projecting said spreader between the adjoining strands in said gears, supports on said spreader for abutting against said strands, drive means operative to then rotate said gears through the tying cycle and bring them to rest with their slots opening toward the completed bale, said drive means being operative to retract the spreader at the conclusion of the tying cycle and permit stripping of the completed knot from the gears by the tension of the strands around the bale.

11. A strand tying mechanism for hay balers comprising a pair of relatively axially spaced wrapping gears having radial slots opening through their respective peripheries, means for rotating said gears during each tying cycle and bringing them to rest with their slots in predetermined registering positions, needle means for projecting a strand loop substantially into the plane of said slots at a delivery point on one axial side of said gears, a strand severing device fixedly supported on the other axial side of said gears, a strand guide adjacent to said delivery point in the radial plane of said slots, a strand laying arm mounted for longitudinal movement between said delivery point and said severing device, means for guiding said arm laterally around said gears and thence back into alignment therewith incident to its said longitudinal movement, hooks on said arm for taking said loop from the needle means and maintaining the opposite sides of said loop in longitudinally spaced relation, a normally inoperative strand switch associated with said guide and moveable from its inoperative position to an operative position in which strands carried by said arm are engaged by it and directed onto said guide, means carried by said arm for operatively positioning said switch to direct the trailing side of said loop onto said guide during movement of the arm away from said delivery point, said arm functioning during its operative movement away from said delivery point to lay the leading side of the loop in said twister alongside a previously laid strand free end and thence into operative engagement with said severing device to form a new strand free end.

12. A strand tying mechanism comprising a pair of relatively axially spaced wrapping gears having radial slots opening through their respective peripheries, clamp means aligned with said slots of the respective gears for yieldingly holding the free ends of strands to be tied by said mechanism, means supporting said gears for rotation about their axes, a strand spreader disposed for projection between said gears in a direction generally radially inwardly from the mouths of said slots, and between the strands held in said clamps, said spreader being provided with strand supports to prevent displacement of said strands toward the mouths of said slots, means for rotating said gears a predetermined number of complete revolutions to wrap portions of the free ends about said strands on opposite sides of the spreader, thus spacing apart portions of the strands between said wrapped portions, inserters moveable between said spaced apart strand portions toward the mouths of said slots to take the free ends from the respective clamps and insert them between the spaced strand portions, said supports maintaining the strands against displacement by said inserts, and means retracting said spreader from between said strands to permit stripping of the complete knot.

13. The combination of claim 12 in which said tying mechanism is mounted on a bale case to tie strands of wire about bales of hay therein, said wrapping gears normally being at rest with their slots open toward said bale case, whereby the tension of a completed tie about a bale may function to strip the completed knot from said gears.

14. A strand tying mechanism comprising a pair of relatively axially spaced tying elements having radial slots opening through their respective peripheries, and clamp means aligned with said slots within the respective elements for yieldingly holding the free ends of strands to be tied by said mechanism, means supporting said elements for rotation about their axes, a strand spreader disposed for projection between said elements in a direction generally radially inwardly of the mouths of said slots and between the strands held in said clamps, means for rotating said elements a predetermined number of complete revolutions to wrap portions of the free ends about said strands on opposite sides of the spreader, the spreader spacing apart portions of the strands between said wrapped portions, and inserts moveable between said spaced strand portions toward the mouths of said slots to take the free ends from the respective clamps and insert them between the spaced strand portions.

15. In a hay baler of the class in which bales are successively formed in and moved longitudinally forwardly through a bale case, a needle on one side of said case for projecting a strand loop around the rear end of a completed bale to complete the banding of said bale and to form a free strand end for use in the banding of a succeeding bale, the combination with said bale case and needle of a strand laying member for taking said loop from the needle and carrying it longitudinally forwardly alongside the bale case in the direction of movement of the bale, strand supporting hooks spaced apart on said member transversely of its movement for supporting a transversely extending section of said loop, a strand severing device fixedly positioned medially of the paths of movement of said hooks, to have said transversely extending loop section drawn thereagainst and severed by movement of the member.

16. The combination of claim 15 including clamp means associated with said hooks to hold one of the free ends of the severed loop across the bale case as a new bale is formed thereagainst.

17. The combination of claim 15 including a pulley supported on the bale case between said needle in its projected position and said strand severing device, means for guiding one side of the loop around said pulley as the loop is carried toward said severing device, clamp means associated with one of said hooks for holding the free end of said one side of the loop across the bale case as a new bale is formed thereagainst, the pressure of said bale against the said loop side tending to return said arm toward said pulley, resilient means associated with the said arm resisting said return, and means located in the path of movement of the clamp means for actuating said clamp means to release the free end at a predetermined point in the return movement of the arm.

18. In a hay baler of the class in which bales are successively formed in and moved longitudinally forwardly through a bale case, a needle at one side of said case for projecting a strand loop around the rear end of a completed bale to provide a strand to complete the banding of said bale and to form a free strand end for use in the banding of a succeeding bale, the combination with said bale case and needle of a strand tying mechanism mounted on the bale case forwardly of and in longitudinal alignment with the needle in its projected position, a strand guide roller, means for obstructing the engagement of a strand with the roller, said strand guide roller being located between said strand tying mechanism and the needle in its projected position and in longitudinal alignment with said tying mechanism to guide a free end strand thereinto incident to forward movement of the bale against said strand, and a strand laying arm controlling said obstructing means and taking said loop from the needle and laying opposite sides of said loop in the tying mechanism and around the guide roller respectively, together with a strand severing device then operable to sever said loop substantially at its bight.

19. The combination of claim 18 including clamp means carried by said strand laying arm to hold the severed free end of the strand which extends around said guide and across the bale case during formation of a succeeding bale against said strand, and means for actuating said clamp means to release the said strand responsive to inception of the next tying cycle.

20. The combination of claim 18 including clamp means carried by said strand laying arm to hold the severed free end of the strand which extends around said guide and across the bale case during formation of a succeeding bale against said strand, resilient means associated with said laying arm resisting its said return, and means for actuating said clamp means to release the said strand responsive to the next tying cycle.

21. In a hay baler of the class in which bales are successively formed in and moved longitudinally forwardly through a bale case, a needle on one side of said case projecting a strand loop around the rear end of a completed bale to complete the banding of said bale and to form a free strand end for use in the banding of a succeeding bale, the combination with said bale case and needle of a strand tying mechanism mounted on the bale case forwardly of and in longitudinal alignment with the needle in its projected position, said tying mechanism having a strand receiving slot normally opening toward the bale case, a strand guide located between said strand tying mechanism and the needle in its projected position and in longitudinal alignment with said tying mechanism to guide a strand between the bale case and tying mechanism and into the slot of the latter incident to forward movement of the bales against said strand, and a strand laying arm for taking said loop from the needle and laying opposite sides of said loop in the tying mechanism and around the guide respectively.

22. The combination of claim 18 in which said strand severing device comprises a stationary cutting edge supported on the bale case forwardly of the tying mechanism and in the path through which said loop is projected by the wire laying arm, to thus sever said loop responsive to movement of the wire laying arm.

23. In a hay baler banding mechanism of the class in which a strand loop after being projected across a longitudinally extending bale case is then taken by a strand laying mechanism and moved longitudinally of the bale case to lay one side of said loop in a strand tying mechanism, the combination with said strand laying mechanism of a wire guide positioned to one side of the path of movement of said loop when carried by the strand laying mechanism, a switch element moveable between an inoperative position out of the path of said loop and an operative position in which it projects into the path of movement of the loop to direct same onto said guide, means for projecting said switch element to operative position, and control means carried by the laying mechanism for causing said switch element to remain in inoperative position until after one side of the loop has been moved therepast by the laying mechanism, and then to move to operative position to switch the other side of said loop onto the said guide.

24. The combination of claim 23 in which said means for projecting the switch element is of the resilient type normally urging said element toward operative position, and said control means comprises a projection located on the strand laying means in a position to force said switch element toward inoperative position.

25. The combination of claim 23 in which said switch comprises a supporting pintle, a bracket rotatably receiving said pintle and supporting said switch for swinging movement between operative and inoperative positions, a spring normally biasing said switch toward operative position, a lever arm fixed to said pintle and projecting radially therefrom, and said control means comprises a projection carried by the strand laying means to abut against said lever arm and rotate said switch to operative position.

26. In a strand tying mechanism for a hay baler including a peripherally slotted tying element rotatable on said baler about a longitudinal axis, and strand laying means moveable longitudinally of the baler forwardly past said tying element for laying one side of a strand loop in the slot of said tying element, the combination including strand engaging hooks spaced apart diametrically on said strand laying means with respect to said element, one of said hooks being located on said laying means for movement in a path outside of and adjacent the mouth of the peripheral slot of said element, and another of said hooks being located on said laying means for movement in a path located substantially diametrically oppositely from the mouth of said slot, said one hook being mounted on said laying means for movement between an operative strand engaging position and a strand releasing inoperative position, and means controlling said one hook to release said strand loop after said one hook is moved longitudinally past the tying element, whereupon continued movement of the laying means will take up the slack in said loop and cause the released side of the loop to move diametrically into said slot toward said other hook.

27. The combination of claim 26 in which a latch is provided for normally holding said one hook in operative position, and means located in the path of movement of said latch forwardly of said tying element for releasing said latch and permitting movement of the hook to inoperative strand releasing position after the hook has moved forwardly past the tying element.

28. The combination of claim 26 in which a latch is provided for normally holding said one hook in operative position, means being located in the path of movement of said latch forwardly of said tying element for releasing said latch and permitting movement of the hook to inoperative strand releasing position after the hook has moved forwardly past the tying element, and spring means associated with said hook for automatically returning same to its operative latched position immediately following the release therefrom of the strand.

29. The combination of claim 26 in which said one hook is pivotally mounted on the laying means, a spring normally biasing said hook about its pivotal mounting toward operative position, an automatically engageable latch normally retaining said hook in an operative position, and cam means located in the path of forward movement of said latch for releasing same and permitting movement of said hook into inoperative position responsive to the drag thereon of the loop, said spring functioning to automatically return the hook to its operative latched position upon release of the loop.

30. In a bale banding mechanism, a strand laying arm moveable back and forth in a predetermined path, means supporting the arm for such back and forth movement, a clamp carried by said arm, said clamp comprising a pin supported on said arm for rotary movement about an axis transverse to said back and forth movement and for movement along said axis, cam surfaces on said pin and arm respectively cooperating to move said pin axially incident to its rotary movement, and a bipartite roller comprising separate roller sections relatively axially moveable on said pin and axially confined between said arm and movement limiting means on said pin, said sections jointly defining between them a strand receiving groove, a control arm projecting radially from said pin, and a stop positioned in the path of said control arm and engageable with said control arm on the forward stroke thereof to draw said roller sections into gripping relation against a strand received between them in said groove.

31. The combination of claim 30 including a second stop spaced rearwardly from the first mentioned stop in the path of back movement of said control arm, to permit separation of said roller sections and release of said strand.

32. The combination of claim 30 in which the control arm is shaped and functions as the point of a hook for initially engaging and guiding the strand onto the said roller sections.

33. In a bale banding mechanism, a supporting means, a shaft journaled in said means, a strand laying arm pivoted on said shaft for rotary movement with said shaft and for swinging movement about an axis transverse to said shaft, a rocking lever fixed to said arm and projecting radially from its said axis of swinging movement, a cam track carried by said supporting means eccentrically to said shaft, a follower, and means connecting same to said laying arm for rotary movement therewith, including a link connecting said follower to the control arm whereby the resultant radial movement of said follower relative to the shaft will produce swinging movement of the arm about said transverse axis.

34. The combination of claim 33 in which the means connecting said follower to the laying arm comprises a bracket fixed on said shaft, a cross shaft extending between and connecting said follower and said bracket in radially spaced relation to said shaft.

35. The combination of claim 33 in which the means connecting said follower to the laying arm comprises a bracket fixed on said shaft, a cross shaft extending between and connecting said follower and said bracket in radially spaced relation to said shaft, said link having slots receiving and guiding it for movement on said shaft and said cross shaft respectively.

36. In a hay baler of the class in which bales are successively formed in and moved longitudinally forwardly through a bale case, a needle on one side of said case for projecting a strand loop around the rear end of a completed bale to complete the banding of said bale and to form a free strand end for use in the banding of a succeeding bale, the combination with said bale case and needle of a strand laying arm for taking said loop from the needle and carrying it longitudinally forwardly alongside the bale case in the direction of movement of the bales, strand supporting hooks spaced apart on the said arm transversely of its movement for supporting a transversely extending section of said loop, a strand severing device fixedly positioned medially of the paths of movement of said hooks to have said transversely extending loop section drawn thereagainst and severed by movement of the arm, a pulley supported on the bale case between said needle and its projected position and said strand severing device, means for guiding one side of the loop around said pulley as the loop is carried toward said severing device, clamp means carried by the laying arm for holding the free end of said one side of the loop across the bale case as a new bale is formed thereagainst, the pressure of said bale against the said loop side tending to return said arm toward said pulley, means located between said needle and the severing device for actuating said clamp means to release the free end at a predetermined point in the return movement of the arm, a longitudinally reciprocating drive element, means driving same through a complete reciprocation terminating at the end of its forward stroke during each tying cycle, means establishing an operative driving connection between the drive element and laying arm during the latter portion of the initial rearward stroke of said element, and means operable to disrupt said driving connection near the end of each forward stroke of the drive element.

37. The mechanism of claim 18 including clamp means carried by said strand laying arm to hold the severed end of the strand which extends around said guide and across the bale case during formation of a succeeding bale against said strand, in combination with a longitudinally reciprocating drive element, means driving said element through a complete reciprocation terminating at the end of its forward stroke during each tying cycle, means establishing an operative driving connection between the drive element and laying arm during the latter portion of the rearward stroke of said element, and means operative to disrupt said driving connection near the end of each forward stroke of the drive element.

38. The mechanism of claim 18 including clamp means carried by said strand laying arm to hold the severed end of the strand which extends around said guide and across the bale case during formation of a succeeding bale against said strand, in combination with a longitudinally reciprocating drive element, means driving said element through a complete reciprocation terminating at the end of its forward stroke during each tying cycle, means establishing an operative driving connection between the drive element and laying arm during the latter portion of the rearward stroke of said element, means operative to disrupt said driving connection near the end of each forward stroke of the drive element, the pressure of the bale against said strand functioning to move said arm rearwardly toward said guide, and means for operating said clamp means to release the said strand responsive to inception of the next tying cycle.

39. In a hay baler of the class in which bales of hay are formed in and moved longitudinally of a bale case, the combination with said bale case of radially slotted tying element rotatable about a longitudinal axis, strand laying mechanism moveable longitudinally past said element to engage a strand loop positioned on one longitudinal side thereof and lay one side of said loop in the radial slot of said element, said laying mechanism including strand guides relatively spaced in the plane of said slot, one of said guides being located outwardly of the mouth of said slot to position one side of the loop for reception therein, and another of said guides being located oppositely and beyond the said slot, means being provided for releasing the loop from the said one guide after said one side of the loop has been positioned for reception in the slot and prior to termination of the movement of the laying mechanism, whereby the tension of the loop will draw said one side radially into the slot toward said other guide.

40. A hay baler including a bale case in which bales are successively formed and moved longitudinally therethrough, means for projecting a strand loop across said bale case around the rear end of a completed bale therein, in combination with a strand tying mechanism mounted on the bale case forwardly of and in longitudinal alignment with said means in its projected position, a strand guide roller located between said strand tying mechanism and said means in its projected position and in longitudinal alignment with said tying mechanism to guide a strand thereinto incident to forward movement of the bales against said strand, a strand laying arm for taking said loop from said means, and laying opposite sides of said loop in the tying mechanism and around the guide roller respectively, and a strand severing device being operable to then sever said loop substantially at its bight.

References Cited in the file of this patent
UNITED STATES PATENTS

| | | |
|---|---|---|
| 2,335,647 | Haase | Aug. 15, 1944 |
| 2,518,687 | Harvey | Aug. 15, 1950 |
| 2,528,538 | Nolt | Nov. 7, 1950 |